United States Patent
Bai et al.

(10) Patent No.: US 12,405,445 B2
(45) Date of Patent: Sep. 2, 2025

(54) OPTICAL SYSTEM AND VR DISPLAY DEVICE

(71) Applicant: BOE TECHNOLOGY GROUP CO., LTD., Beijing (CN)

(72) Inventors: Jiarong Bai, Beijing (CN); Ruijun Dong, Beijing (CN); Yulong Wu, Beijing (CN); Chenru Wang, Beijing (CN); Ke Li, Beijing (CN); Na Han, Beijing (CN); Zhanshan Ma, Beijing (CN); Lili Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/920,132

(22) PCT Filed: Nov. 25, 2021

(86) PCT No.: PCT/CN2021/133282
§ 371 (c)(1),
(2) Date: Oct. 20, 2022

(87) PCT Pub. No.: WO2023/092421
PCT Pub. Date: Jun. 1, 2023

(65) Prior Publication Data
US 2024/0219684 A1   Jul. 4, 2024

(51) Int. Cl.
*G02B 9/10*   (2006.01)

(52) U.S. Cl.
CPC .................................... *G02B 9/10* (2013.01)

(58) Field of Classification Search
CPC .................. G02B 9/10; G02B 13/00
USPC ........................................................ 359/795
See application file for complete search history.

(56) References Cited

U.S. PATENT DOCUMENTS

| | | | |
|---|---|---|---|
| 2018/0088313 A1* | 3/2018 | Jhang | G02B 9/10 |
| 2018/0149832 A1* | 5/2018 | Trygubov | G02B 27/0025 |
| 2018/0275392 A1 | 9/2018 | Song et al. | |
| 2019/0258028 A1* | 8/2019 | Huang | H04N 23/55 |
| 2019/0353905 A1 | 11/2019 | Yang | |
| 2021/0018955 A1* | 1/2021 | Ciou | G02B 17/0856 |

(Continued)

FOREIGN PATENT DOCUMENTS

| | | |
|---|---|---|
| CN | 205176383 U | 4/2016 |
| CN | 105589208 A | 5/2016 |

(Continued)

*Primary Examiner* — Stephone B Allen
*Assistant Examiner* — Boutsikaris Leonidas
(74) *Attorney, Agent, or Firm* — XSENSUS LLP

(57) ABSTRACT

An optical system has an optical axis, and includes a positive focal power lens, a negative focal power lens and a display. The positive focal power lens includes a first convex surface away from the display and a second convex surface proximate to the display. The negative focal power lens includes a third convex surface away from the display and a fourth concave surface proximate to the display. For a refractive index of the positive focal power lens and a refractive index of the negative focal power lens, one is greater than another, and a greater refractive index is a first refractive index, a smaller refractive index is a second refractive index, the first refractive index is greater than 1.7, the second refractive index is greater than 1.5, and a ratio of the first refractive index to the second refractive index is less than or equal to 2.

19 Claims, 9 Drawing Sheets

(56) References Cited

U.S. PATENT DOCUMENTS

2021/0302627 A1     9/2021  Suzuki et al.
2023/0073671 A1 *   3/2023  Chen .................... G02B 27/18

FOREIGN PATENT DOCUMENTS

| CN | 106199967 A * | 12/2016 | ......... G02B 27/0172 |
| CN | 106405841 A   | 2/2017  | |
| CN | 106526852 A   | 3/2017  | |
| CN | 107045196 A   | 8/2017  | |
| CN | 107632388 A   | 1/2018  | |
| CN | 108051920 A   | 5/2018  | |

* cited by examiner

OPTICAL SYSTEM AND VR DISPLAY DEVICE

CROSS-REFERENCE TO RELATED APPLICATION

This application is a national phase entry under 35 USC 371 of International Patent Application No. PCT/CN2021/133282, filed on Nov. 25, 2021, which is incorporated herein by reference in its entirety.

TECHNICAL FIELD

The present disclosure relates to the field of display technologies, and in particular, to an optical system and a VR display device.

BACKGROUND

Virtual reality (VR) technology is an innovative and high technology involving various disciplines, which integrates computer simulation, three-dimensional design, image manipulation, pattern recognition, microelectronics and parallel processing technology, and creates a realistic virtual environment by using a virtual reality hardware device and a computer system. Users experience the same feelings in the virtual space as in the real world, such as vision, hearing, touch, smell, collision, dynamic interaction of moving and carrying, etc.

At present, VR display devices are developing towards large field of view, light weight and small thickness, so as to bring better immersion to viewers and improve the user experience.

SUMMARY

In an aspect, an optical system is provided. The optical system has an optical axis. The optical system includes a positive focal power lens, a negative focal power lens and a display that are sequentially arranged along the optical axis. The positive focal power lens includes a first convex surface that is away from the display and a second convex surface that is proximate to the display. The first convex surface and the second convex surface are both outwardly convex with respect to an optical center of the positive focal power lens. The negative focal power lens includes a third convex surface that is away from the display and a fourth concave surface that is proximate to the display. The third convex surface is outwardly convex with respect to an optical center of the negative focal power lens, and the fourth concave surface is inwardly concave with respect to the optical center of the negative focal power lens. For a refractive index of the positive focal power lens and a refractive index of the negative focal power lens, one refractive index is greater than another refractive index, a greater refractive index is a first refractive index, a smaller refractive index is a second refractive index, the first refractive index is greater than 1.7, the second refractive index is greater than 1.5, and a ratio of the first refractive index to the second refractive index is less than or equal to 2.

In some embodiments, a radius of curvature of the fourth concave surface of the negative focal power lens is less than a radius of curvature of the third convex surface.

In some embodiments, a radius of curvature of the fourth concave surface is greater than 0 mm, and less than or equal to 50 mm; a radius of curvature of the third convex surface is greater than 0 mm, and less than or equal to 100 mm.

In some embodiments, the negative focal power lens includes a middle portion that is proximate to the optical axis and an edge portion that surrounds the middle portion. A thickness of the middle portion along the optical axis is less than a thickness of the edge portion along the optical axis.

In some embodiments, the ratio of the first refractive index to the second refractive index is less than or equal to 1.1.

In some embodiments, a focal power of the positive focal power lens is in a range from 0.05 mm$^{-1}$ to 0.15 mm$^{-1}$, inclusive. The refractive index of the positive focal power lens is greater than the refractive index of the negative focal power lens.

In some embodiments, a focal power of the negative focal power lens is in a range from −0.1 mm$^{-1}$ to −0.02 mm$^{-1}$, inclusive.

In some embodiments, the first refractive index is $N_1$, and the second refractive index is $N_2$. A distance between the second convex surface of the positive focal power lens and the third convex surface of the negative focal power lens along the optical axis is D, and 0.53 mm<$N_1/N_2$ D<0.55 mm.

In some embodiments, the distance between the second convex surface of the positive focal power lens and the third convex surface of the negative focal power lens along the optical axis is in a range from 0.5 mm to 0.55 mm.

In some embodiments, a distance, along the optical axis, between a vertex of the first convex surface of the positive focal power lens and a surface of the display away from the negative focal power lens is less than or equal to 35 mm.

In some embodiments, the refractive index of the positive focal power lens is $N_a$, and a dispersion coefficient of the positive focal power lens is $V_a$. The refractive index of the negative focal power lens is $N_b$, and a dispersion coefficient of the negative focal power lens is $V_b$. For $V_a/N_a$ and $V_b/N_b$, one is greater than another, and a ratio of a greater one to a smaller one is less than or equal to 2.5.

In some embodiments, the first convex surface, the second convex surface, the third convex surface and the fourth concave surface are all aspherical surfaces.

In some embodiments, the first convex surface, the second convex surface, the third convex surface and the fourth concave surface are all even-order aspheric surfaces. A surface equation of each surface of the first convex surface, the second convex surface, the third convex surface and the fourth concave surface is $$Z = \frac{cr^2}{1 + \sqrt{1 - (k+1)c^2r^2}} + \sum_i A_{2i} r^{2i}.$$

Z is a vertical distance between a point on the surface and a first reference surface, and the first reference surface is tangent to a vertex of the surface; c is a curvature at the vertex of the surface; k is a quadric coefficient of the surface; r is a vertical distance between the point on the surface and the optical axis; $A_{2i}$, is a coefficient of a multiple order term; i is greater than or equal to 1 (i≥1), and i is an integer.

In some embodiments, a material of the positive focal power lens includes glass, and a material of the negative focal power lens includes plastic.

In some embodiments, a mass of the positive focal power lens is greater than a mass of the negative focal power lens.

In some embodiments, the optical system further includes a fixed component and a movable component. The positive focal power lens and the negative focal power lens are disposed on the fixed component. The movable component is slidably connected to the fixed component. The display is disposed on the movable component, and the movable component is configured to drive the display to move along the optical axis.

In another aspect, a VR display device is provided. The VR display device includes the optical system as described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
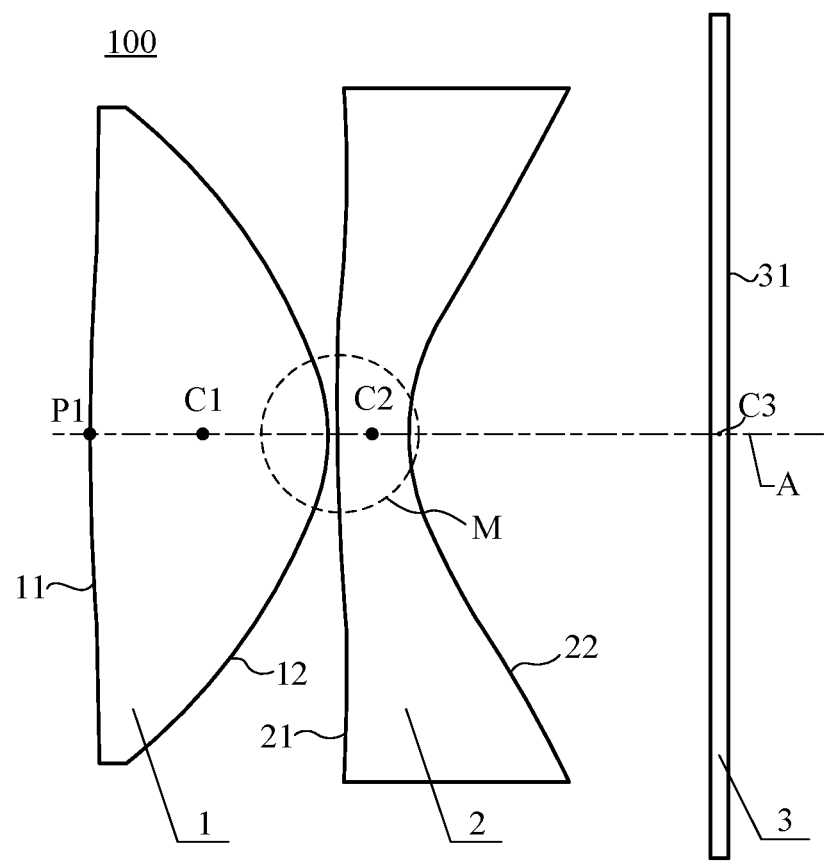
FIG. 1 is a structural diagram of an optical system, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description of the specification, the term such as "one embodiment", "some embodiments", "exemplary embodiments", "example", "specific example" or "some examples" is intended to indicate that specific features, structures, materials or characteristics related to the embodiment(s) or example(s) are included in at least one embodiment or example of the present disclosure. Schematic representation of the above term does not necessarily refer to the same embodiment(s) or example(s). In addition, the specific features, structures, materials, or characteristics may be included in any one or more embodiments or examples in any suitable manner.

Hereinafter, the terms "first" and "second" are only used for descriptive purposes, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "multiple", "a plurality of" or "the plurality of" means two or more unless otherwise specified.

In the description of some embodiments, the term "connected" and derivatives thereof may be used. For example, the term "connected" may be used in the description of some embodiments to indicate that two or more components are in direct physical or electrical contact with each other.

The use of the phrase "configured to" herein means an open and inclusive expression, which does not exclude devices that are applicable to or configured to perform additional tasks or steps.

Additionally, the use of the phase "based on" is meant to be open and inclusive, since a process, step, calculation or other action that is "based on" one or more of the stated conditions or values may, in practice, be based on additional conditions or value beyond those stated.

The term "perpendicular" as used herein includes a stated condition and a condition similar to the stated condition. A range of the similar condition is within an acceptable range of deviation of a particular value. The acceptable range of deviation is determined by a person of ordinary skill in the art in view of measurement in question and the error associated with measurement of a particular quantity (i.e., limitations of a measurement system). For example, the term "perpendicular" includes absolute perpendicularity and approximate perpendicularity, and an acceptable range of deviation of approximate perpendicularity may also be, for example, a deviation within 5°.

Exemplary embodiments are described herein with reference to sectional views and/or plan views as idealized exemplary drawings. In the accompanying drawings, thicknesses of layers and sizes of regions are enlarged for clarity. Variations in shapes with respect to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown in a rectangular shape generally has a feature being curved. Therefore, the regions shown in the accompanying drawings are schematic in nature, and their shapes are not intended to show actual shapes of the regions in a device, and are not intended to limit the scope of the exemplary embodiments.

In the related art, a VR display device has a catadioptric pancake-shaped structure. With this structure design, although the display device may have a small thickness, it will lead to a low light-emitting efficiency of the display device (the light-emitting efficiency is less than 25%), the existence of "ghosting" in a viewing image and a small field of view of the viewing image, and in turn lead to a poor visual experience of a viewer.

In order to solve the above problem, as shown in FIG. 1, some embodiments of the present disclosure provide an optical system 100. The optical system 100 has an optical axis A. The optical axis A is an axis of symmetry of the optical system 100.

As shown in FIG. 1, the optical system 100 includes a positive focal power lens 1, a negative focal power lens 2 and a display 3 that are sequentially arranged along the optical axis A. Furthermore, an optical center C1 of the positive focal power lens 1, an optical center C2 of the negative focal power lens 2 and an optical center C3 of the display 3 are all located on the optical axis A.

It will be noted that, the focal power of the "positive focal power lens 1" is greater than 0, and light rays converge after being refracted by the positive focal power lens 1. The focal power of the "negative focal power lens 2" is less than 0, and light rays diverge after being refracted by the negative focal power lens 2.

As shown in FIG. 1, the positive focal power lens 1 includes a first convex surface 11 that is away from the display 3, and a second convex surface 12 that is proximate to the display 3. The first convex surface 11 and the second convex surface 12 are both outwardly convex with respect to the optical center C1 of the positive focal power lens 1.

As shown in FIG. 1, the negative focal power lens 2 includes a third convex surface 21 that is away from the display 3, and a fourth concave surface 22 that is proximate to the display 3. The third convex surface 21 is outwardly convex with respect to the optical center C2 of the negative focal power lens 2, and the fourth concave surface 22 is inwardly concave with respect to the optical center C2 of the negative focal power lens 2.

For the refractive index of the positive focal power lens 1 and the refractive index of the negative focal power lens 2, one refractive index is greater than the other refractive index. For the convenience of description, the greater refractive index is referred to as the "first refractive index", and the smaller refractive index is referred to as the "second refractive index". The first refractive index is greater than 1.7, the second refractive index is greater than 1.5, and a ratio of the first refractive index to the second refractive index is less than or equal to 2.

For example, the focal length of the optical system 100 is in a range from 20 mm to 35 mm, inclusive. For example, the focal length of the optical system 100 is 20 mm, 25 mm, 28 mm, 30 mm or 35 mm.

Figure 3:
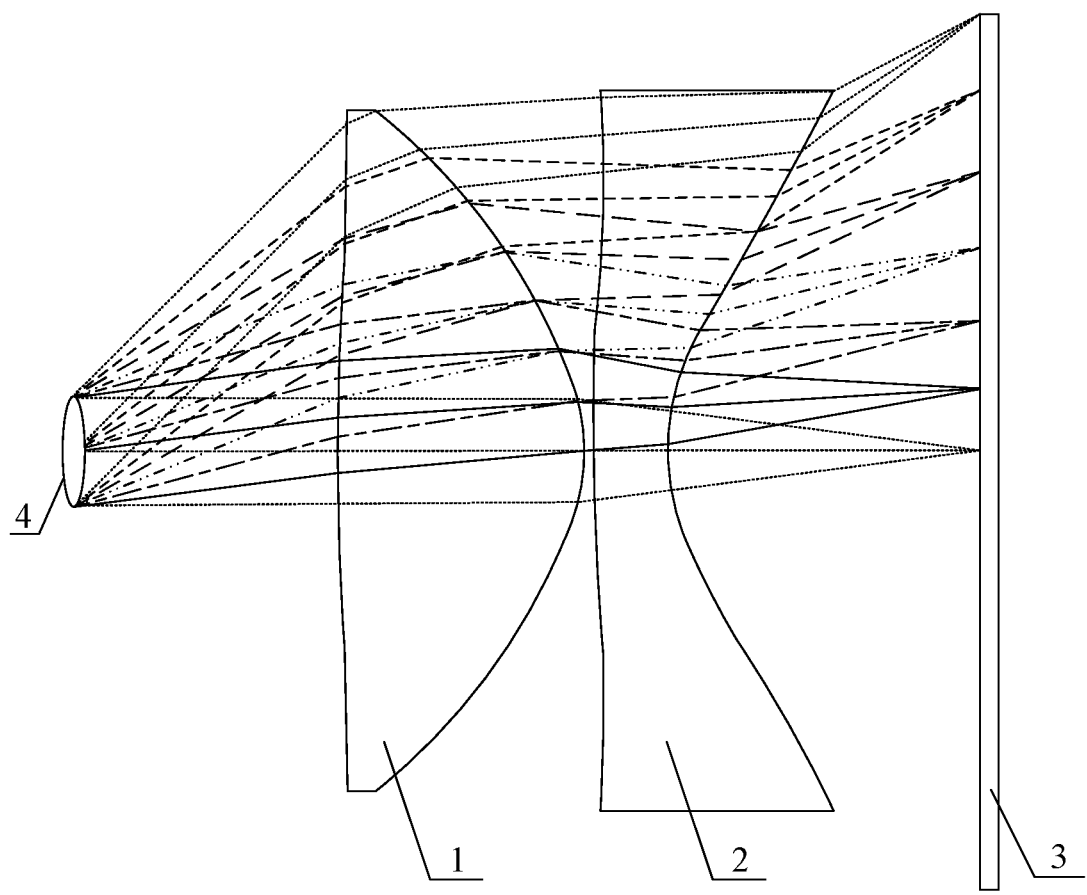
FIG. 3 is an optical path diagram of an optical system, in accordance with some embodiments.

In the above embodiments of the present disclosure, referring to FIGS. 1 and 3, the optical system 100 has a structure design in which the positive focal power lens 1 and the negative focal power lens 2 are combined. In this way, spherical aberration, field curvature and other aberrations of the viewing image of the optical system 100 (the imaging of the optical system 100 at a human eye 4) may be reduced, and stray light in the light emitted by the optical system 100 may be reduced. Therefore, it is possible to improve "ghosting" and glare problems of the image, improve the image quality, and enhance the immersion of the viewer. Furthermore, the optical system 100 has a high light-emitting efficiency.

The fourth concave surface 22 of the negative focal power lens 2 is inwardly concave with respect to the optical center C2 of the negative focal power lens 2, so as to collect light emitted by the display 3 at a large angle. In addition, the refractive index of the positive focal power lens 1 and the refractive index of the negative focal power lens 2 are set as follows: one refractive index is greater than the other refractive index, the greater refractive index is the first refractive index, the smaller refractive index is the second refractive index, the first refractive index is greater than 1.7, the second refractive index is greater than 1.5, and the ratio of the first refractive index to the second refractive index is less than or equal to 2. With the above design, the positive focal power lens 1 and the negative focal power lens 2 may refract a light ray with a large angle into the human eye 4 in a short distance (the focal length of the optical system 100). Therefore, the field of view of viewing image of the optical system 100 may be increased (for example, the field of view is larger than or equal to 90°), and furthermore, the optical system 100 may have light weight and small thickness.

The positive focal power lens 1, the negative focal power lens 2 and the display 3 of the optical system 100, and the association between the three, will be explained and described below with reference to the accompanying drawings.

Figure 4:
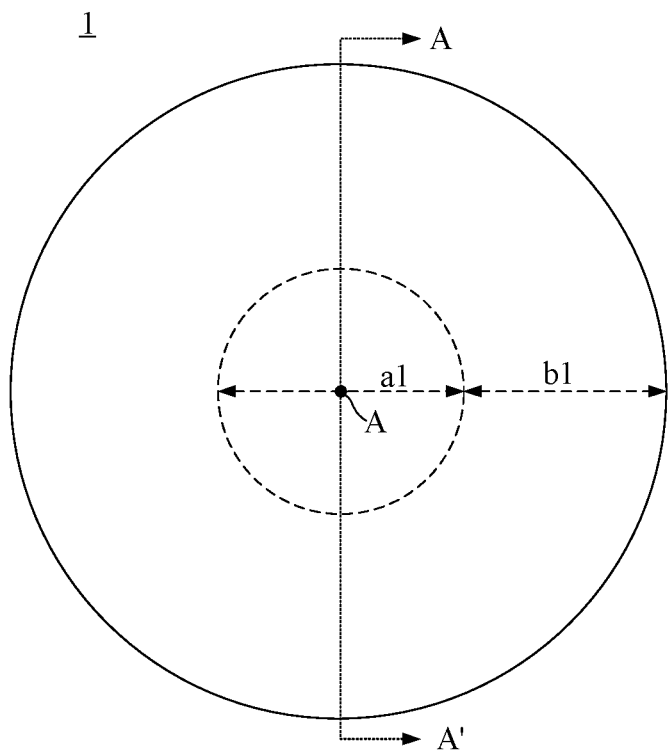
FIG. 4 is a structural diagram of a positive focal power lens of an optical system, in accordance with some embodiments.
Figure 5:
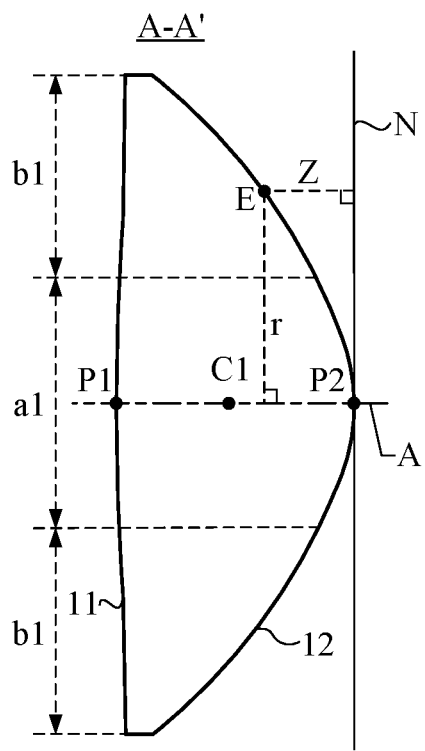
FIG. 5 is a sectional view of the positive focal power lens shown in FIG. 4 taken along the section line A-A'.

In some embodiments, as shown in FIGS. 4 and 5, the focal power of the positive focal power lens 1 is greater than 0 mm$^{-1}$. The focal power of the positive focal power lens 1 is in a range from 0.05 mm$^{-1}$ to 0.15 mm$^{-1}$, inclusive. For example, the focal power of the positive focal power lens 1 is 0.05 mm$^{-1}$, 0.07 mm$^{-1}$, 0.1 mm$^{-1}$, 0.12 mm$^{-1}$ or 0.15 mm$^{-1}$.

In some embodiments, as shown in FIGS. 4 and 5, the first convex surface 11 of the positive focal power lens 1 may be a spherical surface or an aspherical surface, and the second convex surface 12 may be a spherical surface or an aspherical surface.

It will be noted that, the term "spherical surface" means a surface of a lens that has a constant radius of curvature over the entire surface. Considering the first convex surface 11 as an example, the term "aspherical surface" means that the radius of curvature of the surface of the lens increases (the surface of the lens is gradually flattened) from a vertex P1 to an edge of the surface of the lens.

For example, the first convex surface 11 and the second convex surface 12 of the positive focal power lens 1 are both aspherical surfaces, which may reduce spherical aberration, comatic aberration, field curvature and other aberrations of viewing images of the optical system 100.

In some embodiments, as shown in FIGS. 4 and 5, the radius of curvature of the first convex surface 11 of the positive focal power lens 1 is greater than 0 mm, and less than or equal to 100 mm. For example, the radius of curvature of the first convex surface 11 is 20 mm, 40 mm, 60 mm, 80 mm or 100 mm. The radius of curvature of the second convex surface 12 is greater than 0 mm, and less than or equal to 50 mm. For example, the radius of curvature of the second convex surface 12 is 10 mm, 20 mm, 30 mm, 40 mm or 50 mm.

In some embodiments, as shown in FIGS. 4 and 5, the positive focal power lens 1 includes a middle portion a1 that is proximate to the optical axis A, and an edge portion b1 that surrounds the middle portion a1. The thickness of the middle portion a1 along the optical axis A is greater than the thickness of the edge portion b1 along the optical axis A. That is, in the positive focal power lens 1, the middle portion a1 is thicker, and the edge portion b1 is thinner.

In some embodiments, as shown in FIGS. 4 and 5, the material of the positive focal power lens 1 may include glass or plastic.

Figure 6:
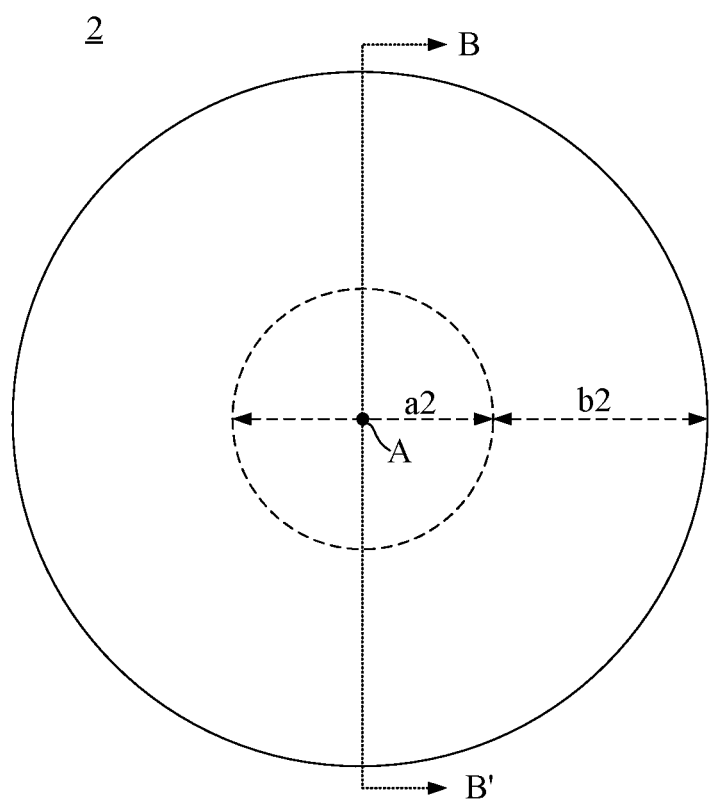
FIG. 6 is a structural diagram of a negative focal power lens of an optical system, in accordance with some embodiments.
Figure 7:
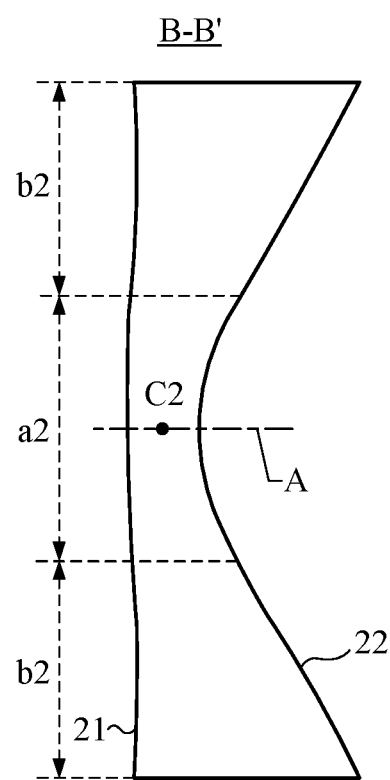
FIG. 7 is a sectional view of the negative focal power lens shown in FIG. 6 taken along the section line B-B'.

In some embodiments, as shown in FIGS. 6 and 7, the focal power of the negative focal power lens 2 is less than 0 mm$^{-1}$. The focal power of the negative focal power lens 2 is in a range from –0.1 mm$^{-1}$ to –0.02 mm$^{-1}$, inclusive. For example, the focal power of the negative focal power lens 2 is –0.1 mm$^{-1}$, –0.08 mm$^{-1}$, –0.06 mm$^{-1}$, –0.04 mm$^{-1}$ or –0.02 mm$^{-1}$.

In some embodiments, as shown in FIGS. 6 and 7, the third convex surface 21 of the negative focal power lens 2 may be a spherical surface or an aspherical surface, and the fourth concave surface 22 may be a spherical surface or an aspherical surface.

For example, the third convex surface 21 and the fourth concave surface 22 of the negative focal power lens 2 are both aspherical surfaces, which may reduce spherical aberration, comatic aberration, field curvature and other aberrations of viewing images of the optical system 100.

In some embodiments, as shown in FIGS. 6 and 7, the radius of curvature of the fourth concave surface 22 of the negative focal power lens 2 is smaller than the radius of curvature of the third convex surface 21 of the negative focal power lens 2.

It can be understood that, the fourth concave surface 22 of the negative focal power lens 2 is inwardly concave with respect to the optical center C2 of the negative focal power lens 2, and the radius of curvature of the fourth concave surface 22 is smaller than the radius of curvature of the third convex surface 21 (that is, the fourth concave surface 22 is more curved than the third convex surface 21); therefore, it is further beneficial for the fourth concave surface 22 to collect the light emitted by the display 3 at a large angle, and is conducive to increasing the field of view of the viewing image of the optical system 100.

For example, as shown in FIGS. 6 and 7, the radius of curvature of the third convex surface 21 of the negative focal power lens 2 is greater than 0 mm, and less than or equal to 100 mm. For example, the radius of curvature of the third convex surface 21 is 20 mm, 40 mm, 60 mm, 80 mm or 100 mm. The radius of curvature of the fourth concave surface 22 is greater than 0 mm, and less than or equal to 50 mm. For example, the radius of curvature of the fourth concave surface 22 is 10 mm, 20 mm, 30 mm, 40 mm or 50 mm.

In some embodiments, as shown in FIGS. 6 and 7, the negative focal power lens 2 includes a middle portion a2 that is proximate to the optical axis A, and an edge portion b2 that surrounds the middle portion a2. The thickness of the middle portion a2 along the optical axis A is smaller than the thickness of the edge portion b2 along the optical axis A. Thus, in the negative focal power lens 2, the middle portion a2 is thinner, and the edge portion b2 is thicker.

In the related art, both side surfaces of the negative focal power lens are inwardly concave with respect to the optical center, that is, both side surfaces of the negative focal power lens are concave surfaces. Thus, the thickness of the middle portion of the negative focal power lens is very small, and difference between thicknesses of the edge portion and the middle portion is large. As a result, the negative focal power lens has a low structural strength and is easily broken.

However, in the embodiments of the present disclosure, as shown in FIGS. 6 and 7, the third convex surface 21 of the negative focal power lens 2 is outwardly convex with respect to the optical center C2 of the negative focal power lens 2. In this way, it may be possible to increase the thickness of the middle portion a2 of the negative focal power lens 2, improve the structural strength of the middle portion a2 of the negative focal power lens 2, and avoid the problem that the middle portion a2 of the negative focal power lens 2 is too thin and is easily broken.

In some embodiments, as shown in FIGS. 6 and 7, the material of the negative focal power lens 2 may include glass or plastic.

In some embodiments, as shown in FIGS. 1 and 3, the refractive index of the positive focal power lens 1 is greater than the refractive index of the negative focal power lens 2. For example, the refractive index of the positive focal power lens 1 is greater than 1.7, and the refractive index of the negative focal power lens 2 is greater than 1.5. In addition, the focal power of the positive focal power lens 1 is in a range from 0.05 mm$^{-1}$ to 0.15 mm$^{-1}$, inclusive. The focal power of the positive focal power lens 1 is relatively small, so that the positive focal power lens 1 may refract light at a large angle into the human eye 4. Based on these, in a case where the positive focal power lens 1 is used in conjunction with the negative focal power lens 2, the field of view of viewing images of the optical system 100 may be increased.

Figure 2:
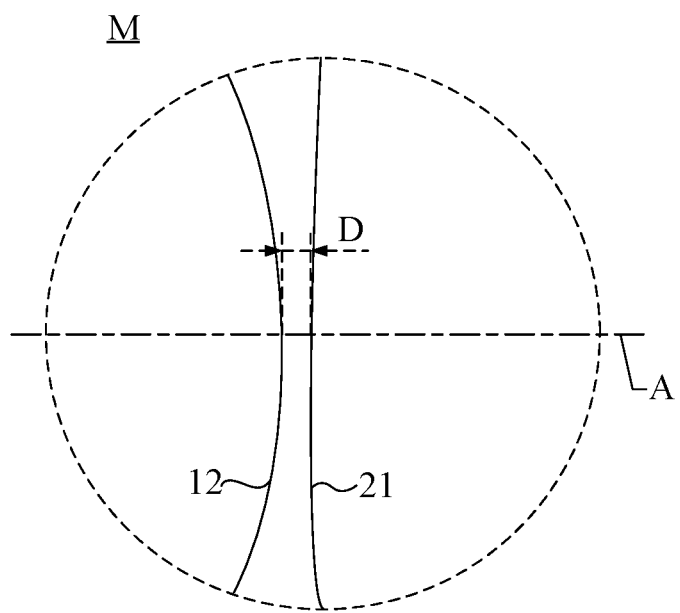
FIG. 2 is an enlarged diagram of the M portion of the optical system shown in FIG. 1.

In some embodiments, as shown in FIGS. 1 and 2, for the refractive index of the positive focal power lens 1 and the refractive index of the negative focal power lens 2, the greater first refractive index is set as $N_1$, and the smaller second refractive index is set as $N_2$. A distance between the second convex surface 12 of the positive focal power lens 1 and the third convex surface 21 of the negative focal power lens 2 along the optical axis A is set as D.

The relationship between the first refractive index $N_1$, the second refractive index $N_2$ and the distance D satisfies the following Formula (1):

$$0.53 \text{ mm} < \frac{N_1}{N_2}D < 0.55 \text{ mm} \tag{1}$$

It can be seen that, according to the set values of the refractive index of the positive focal power lens 1 and the refractive index of the negative focal power lens 2, a reasonable value range of the distance D may be determined. In a case where the distance D is in the reasonable value range, it may be possible to ensure that a length of the optical system 100 is not too large, and ensure the reliability of assembly of the positive focal power lens 1 and the negative focal power lens 2.

It will be noted that, referring to FIG. 1, "the length of the optical system 100" refers to a distance between the vertex P1 of the first convex surface 11 of the positive focal power lens 1 and a surface 31 of the display 3 away from the negative focal power lens 2 along the optical axis A.

For example, the distance D between the second convex surface 12 of the positive focal power lens 1 and the third convex surface 21 of the negative focal power lens 2 along the optical axis A is in a range from 0.5 mm to 0.55 mm, inclusive. For example, the distance D is 0.51 mm, 0.52 mm, 0.53 mm, 0.54 mm or 0.55 mm.

It can be understood that, if the distance D is less than 0.5 mm, a distance between the second convex surface 12 and the third convex surface 21 is too small. That is, a distance between the positive focal power lens 1 and the negative focal power lens 2 is too small, which may cause difficulty in assembling the positive focal power lens 1 and the negative focal power lens 2. If the distance D is greater than 0.55 mm, the distance between the second convex surface 21 and the third convex surface 21 is too large. That is, the distance between the positive focal power lens 1 and the negative focal power lens 2 is too large. As a result, the length of the optical system 100 may be too large, which is not conducive to realizing the light weight and small thickness of the optical system 100.

In some embodiments, as shown in FIG. 1, the distance, along the optical axis A, between the vertex P1 of the first convex surface 11 of the positive focal power lens 1 and the surface 31 of the display 3 away from the negative focal power lens 2 is less than or equal to 35 mm. That is, the length of the optical system 100 is less than or equal to 35 mm. For example, the length of the optical system 100 is 31 mm, 32 mm, 33 mm, 34 mm or 35 mm.

In some embodiments, as shown in FIG. 1, the refractive index of the positive focal power lens 1 is set as $N_a$, and the dispersion coefficient of the positive focal power lens 1 is set as $V_a$. The refractive index of the negative focal power lens 2 is set as $N_b$, and the dispersion coefficient of the negative focal power lens 2 is set as $V_b$. For $V_a/N_a$ and $V_b/N_b$, one is greater than the other, and a ratio of the greater one to the smaller one is less than or equal to 2.5. For example, for $V_a/N_a$ and $V_b/N_b$, the ratio of the greater one to the smaller one is 2.1, 2.2, 2.3, 2.4 or 2.5. In this way, the field curvature and color difference of viewing images of the optical system 100 may be reduced.

In some embodiments, as shown in FIGS. 1 and 3, a mass of the positive focal power lens 1 is greater than a mass of the negative focal power lens 2. It will be noted that, the "mass" of the lens refers to a product of the density of the material of the lens and the volume of the lens. It can be understood that, the optical system 100 in the embodiments of the present disclosure can be applied to a VR display device, and a viewer may wear the VR display device for viewing. Since the mass of the positive focal power lens 1 is greater than the mass of the negative focal power lens 2, and the positive focal power lens 1 is closer to the viewer's eye 4 than the negative focal power lens 2 is, a center of gravity of the VR display device is close to the viewer, which may improve the wearing comfort of the viewer.

For example, the material of the positive focal power lens 1 may include glass, and the material of the negative focal power lens 2 may include plastic, and the density of glass is greater than the density of plastic. In addition, the difference between the volume of the positive focal power lens 1 and the volume of the negative focal power lens 2 is small. Therefore, the mass of the positive focal power lens 1 is greater than the mass of the negative focal power lens 2.

In some embodiments, the positive focal power lens 1 and the negative focal power lens 2 may be Fresnel lenses. The Fresnel lens outputs light uniformly and has a high light efficiency. The optical system 100 with such a design has a uniform image brightness. In addition, the Fresnel lens has a small thickness, which is conducive to realizing the light weight and small thickness of the optical system 100.

In some embodiments, as shown in FIG. 1, the display 3 may be a liquid crystal display (LCD), an organic light-emitting diode (OLED) display, a liquid crystal on silicon (LCOS) display, or the like. The display 3 is a micro display, and a diagonal length thereof is in a range from 1.5 inch to 2.5 inch, inclusive. For example, the diagonal length of the display 3 is 1.5 inch, 1.8 inch, 2 inch, 2.3 inch or 2.5 inch.

The inventors of the present disclosure have found in research that, the refractive index of the positive focal power lens 1 and the refractive index of the negative focal power lens 2 are set as follows: one refractive index is greater than the other refractive index, the greater refractive index is the first refractive index, the smaller refractive index is the second refractive index, the first refractive index is greater than 1.7, the second refractive index is greater than 1.5, and the ratio of the first refractive index to the second refractive index is less than or equal to 1.1. For example, the ratio of the first refractive index to the second refractive index is 1.01, 1.03, 1.05, 1.07 or 1.09. In this case, the field of view of viewing images of the optical system 100 may be further increased, and the optical system 100 may be lighter and thinner.

As mentioned above, as shown in FIG. 1, the first convex surface 11 and the second convex surface 12 of the positive focal power lens 1 may both be aspherical surfaces, and the third convex surface 21 and the fourth concave surface 22 of the negative focal power lens 2 may both be aspherical surfaces. For example, the first convex surface 11, the second convex surface 12, the third convex surface 21 and the fourth concave surface 22 may all be even-order aspheric surfaces. The surface equations of the first convex surface 11, the second convex surface 12, the third convex surface 21 and the fourth concave surface 22 are all as the following Equation (2):

$$Z = \frac{cr^2}{1 + \sqrt{1 - (k+1)c^2 r^2}} + \sum_i A_{2i} r^{2i} \qquad (2)$$

Referring to FIG. 5, considering the second convex surface 12 as an example, in Equation (2), Z is a vertical distance between a point E of a surface (the second convex surface 12) of the lens and a first reference surface N, and the first reference surface N is tangent to a vertex P2 on the surface of the lens; c is a curvature at the vertex P2 of the surface of the lens; k is a quadric coefficient of the surface of the lens; r is a vertical distance between the point E of the surface of the lens and the optical axis A; $A_2$, is a coefficient of a multiple order term; i is greater than or equal to 1 (i≥1), and i is an integer.

Based on these, the inventors designed experiments for verification and the specific values of each parameter of the optical system 100 may be found in Tables 1 and 2 below.

TABLE 1

| f = 25 mm TL = 34 mm FOV = 90° | | | | | | |
|---|---|---|---|---|---|---|
| Lens | Surface of lens | R/mm | T/mm | k | N | V |
| Positive focal power lens 1 | First convex surface 11 | 65.34 | 13 | −83.4 | 1.76 | 52.3 |
| | Second convex surface 12 | −11.4 | 0.5 | −2.22 | | |
| Negative focal power lens 2 | Third convex surface 21 | 84.2 | 4 | −998.92 | 1.64 | 22.4 |
| | Fourth concave surface 22 | 11.37 | 16.5 | −1.3 | | |

In Table 1, "f" refers to the focal length of the optical system 100; "TL" refers to the length of the optical system 100; "FOV", which is the abbreviation of field of view, refers to the field of view of the optical system 100. "R" is a radius of curvature of a surface of a lens, a positive radius of curvature means that a center of curvature of the surface of the lens is located on a side of the surface proximate to the display 3, and a negative radius of curvature means that the center of curvature of the surface of the lens is located on a side of the surface away from the display 3. "T" refers to a distance between adjacent two surfaces. For example, referring to FIG. 5, a distance between the first convex surface 11 and the second convex surface 12 along the optical axis A is 13 mm; referring to FIG. 2, a distance between the second convex surface 12 and the third convex surface 21 along the optical axis A is 0.5 mm; referring to FIG. 7, a distance between the third convex surface 21 and the fourth concave surface 22 along the optical axis A is 4 mm; referring to FIG. 1, a distance between the fourth concave surface 22 and the surface 31 of the display 3 along the optical axis A is 16.5 mm. "N" refers to a refractive index of a lens. "V" refers to a dispersion coefficient of a lens.

The refractive index of the positive focal power lens 1 is 1.76, and the dispersion coefficient of the positive focal power lens 1 is 52.3. The refractive index of the negative focal power lens 2 is 1.64, and the dispersion coefficient of the negative focal power lens 2 is 22.4. The ratio of the refractive index of the positive focal power lens 1 to the refractive index of the negative focal power lens 2 is 1.07. A first ratio of the dispersion coefficient of the positive focal power lens 1 to the refractive index of the positive focal power lens 1 is 29.72, a second ratio of the dispersion coefficient of the negative focal power lens 2 to the refractive index of the negative focal power lens 2 is 13.66, and a ratio of the first ratio to the second ratio is 2.2.

TABLE 2

| Surface of lens | Coefficient of a term with multiple power | | |
| --- | --- | --- | --- |
| | $A_{2i}$, i = 2 | $A_{2i}$, i = 3 | $A_{2i}$, i = 4 |
| First convex surface 11 | $-2.64 \times 10^{-5}$ | $8.31 \times 10^{-8}$ | $-8.35 \times 10^{-11}$ |
| Second convex surface 12 | $-1.94 \times 10^{-6}$ | $-1.04 \times 10^{-7}$ | $2 \times 10^{-10}$ |
| Third convex surface 21 | $3.62 \times 10^{-5}$ | $-2.11 \times 10^{-7}$ | $3.01 \times 10^{-10}$ |
| Fourth concave surface 22 | $-5.54 \times 10^{-5}$ | $5.18 \times 10^{-8}$ | $6.61 \times 10^{-12}$ |

In addition, as shown in FIG. 1, the diagonal length of the display 3 is 2.1 inch; the pixel density of the display 3 is 1500, that is, the number of pixels per inch (PPI) of the display 3 is 1500.

Figure 8:
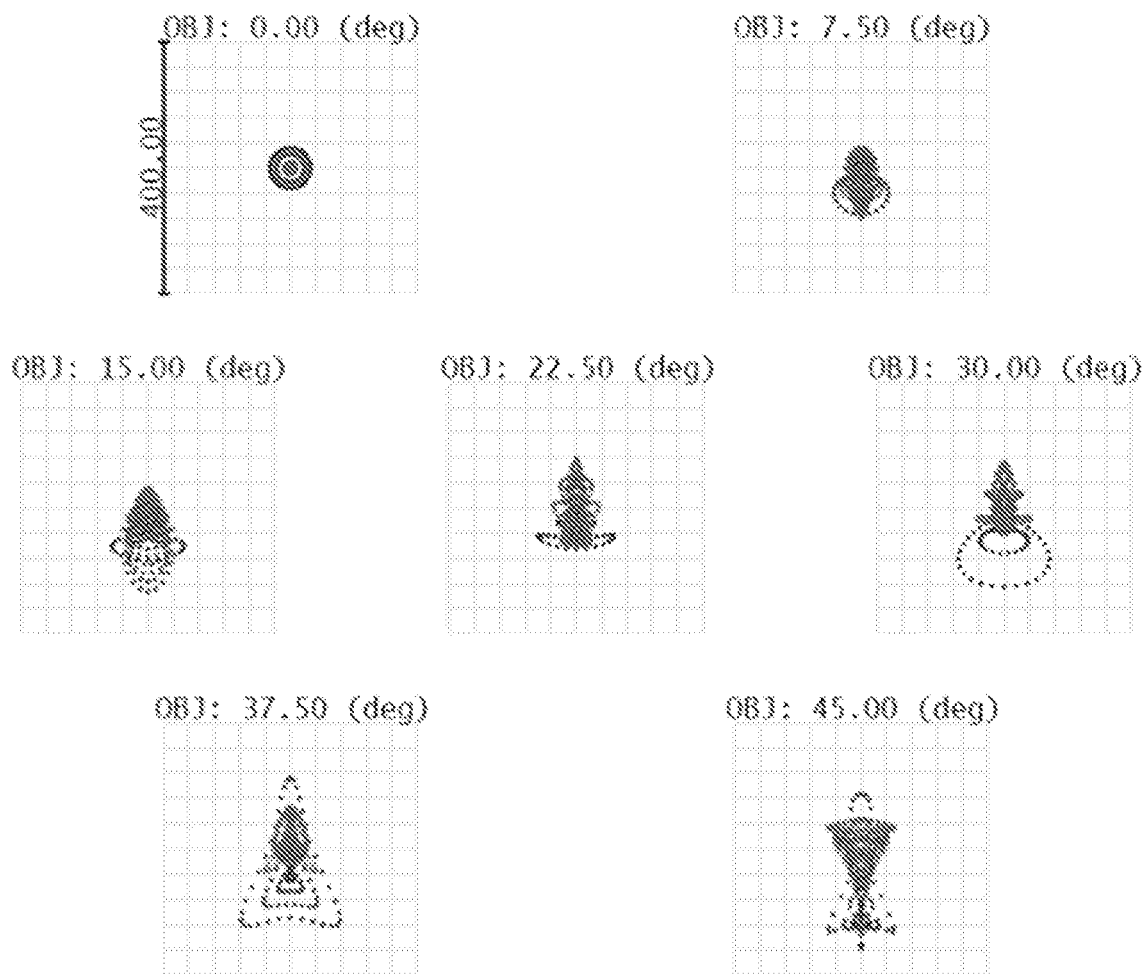
FIG. 8 is a spot diagram of an optical system, in accordance with some embodiments.
Figure 9:
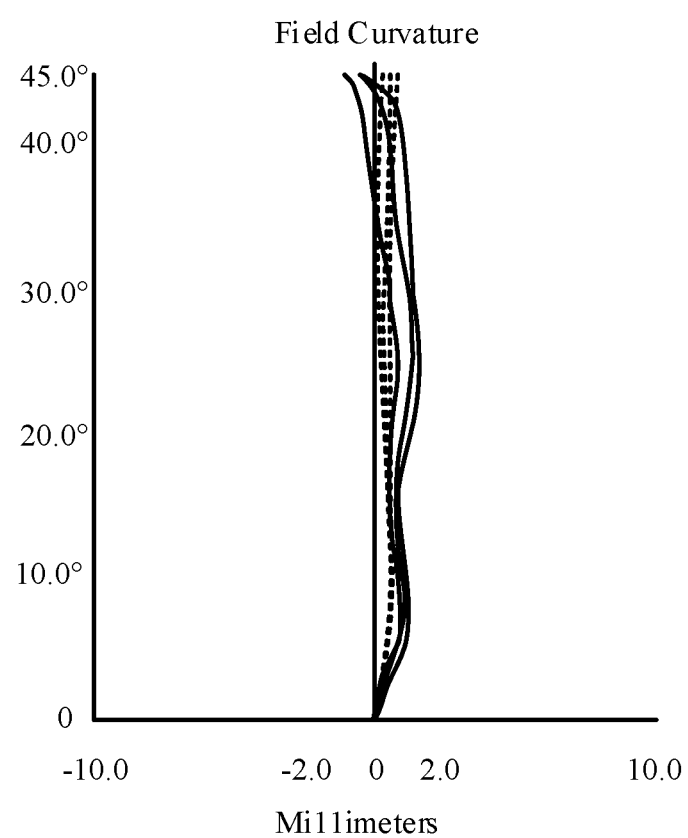
FIG. 9 is a field curvature plot of an optical system, in accordance with some embodiments.
Figure 10:
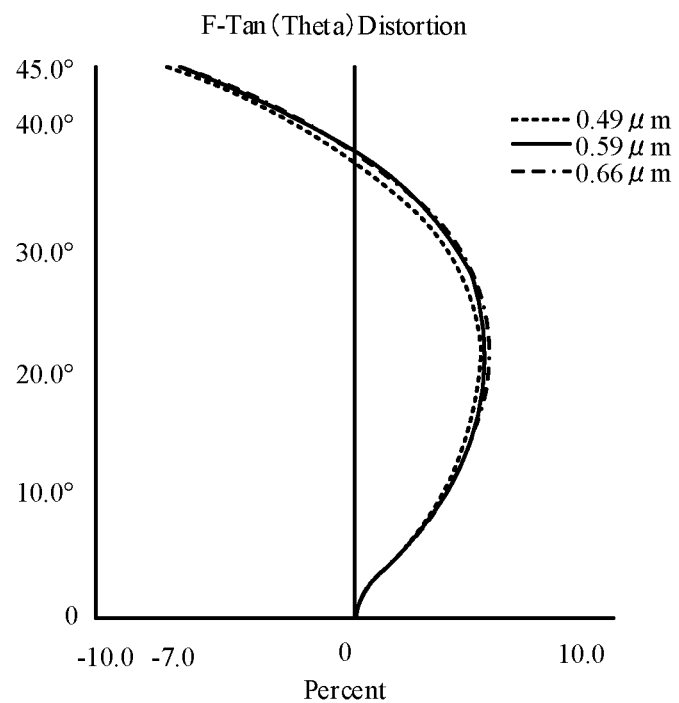
FIG. 10 is a distortion plot of an optical system, in accordance with some embodiments.

For the experimental results, reference can be made to FIGS. 8 to 10. FIG. 8 is a spot diagram showing imaged spots (OBJ) at different viewing angles. In a case where the viewing angle is 0 degree (0°), the geometric spot radius is 32 μm. In a case where the viewing angle is 7.5°, the geometric spot radius is 79 μm. In a case where the viewing angle is 15°, the geometric radius of the spot is 132 μm. In a case where the viewing angle is 22.5°, the geometric radius of the spot is 79 μm. In a case where the viewing angle is 30°, the geometric radius of the spot is 125 μm. In a case where the viewing angle is 37.5°, the geometric radius of the spot is 141 μm. In a case where the viewing angle is 45°, the geometric radius of the spot is 157 μm. It can be seen that, in the case where the viewing angle is 45°, the geometric radius of the spot is the largest, and therefore, the root mean squared radius of the spot is the largest, which is 64 μm.

FIG. 9 is a field curvature plot of the optical system 100. The plurality of solid lines in the field curvature plot indicate the field curvature of light of different wavelengths in the meridian direction, and the plurality of dashed lines indicate the field curvature of light of different wavelengths in the sagittal direction. It can be seen that, in a case where the viewing angle is in a range from 0° to 45° inclusive, the field curvature of the optical system 100 is less than 2.0 mm.

FIG. 10 is a distortion plot of light of different wavelengths emitted by the optical system 100 (F-Tan(Theta) Distortion). It can be seen that, in a case where the viewing angle is in a range from 0° to 45° inclusive, the amount of distortion of the optical system 100 is less than 10%. For example, in a case where the viewing angle is 45°, the amount of distortion of the optical system 100 is the largest, which is 7%. The largest amount of distortion of the optical system 100 is relatively small, which proves that the optical system 100 has a small aberration and a high image quality.

Figure 11:
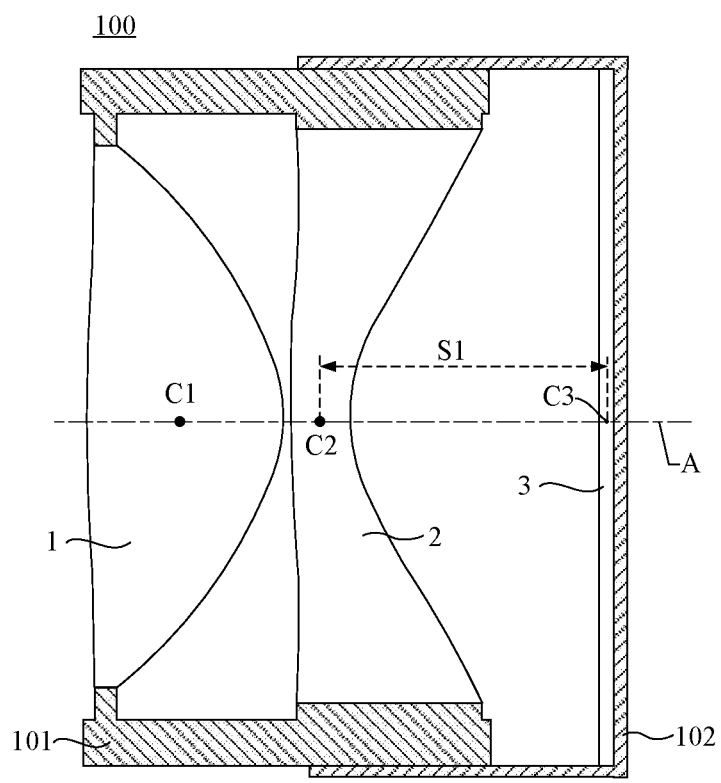
FIG. 11 is a structural diagram of another optical system, in accordance with some embodiments.

In some embodiments, as shown in FIG. 11, the optical system 100 further includes a fixed component 101 and a movable component 102 that are slidably connected to each other. The positive focal power lens 1 and the negative focal power lens 2 are disposed on the fixed component 101, and the display 3 is disposed on the movable component 102. The movable component 102 is configured to drive the display 3 to move along the optical axis A, so that the diopter of the optical system 100 may be adjusted.

For example, as shown in FIG. 11, the distance S1 between the optical center C2 of the negative focal power lens 2 and the center C3 of the display 3 along the optical axis A is 16.5 mm. In this case, the diopter of the optical system 100 is −1 D.

Figure 12:
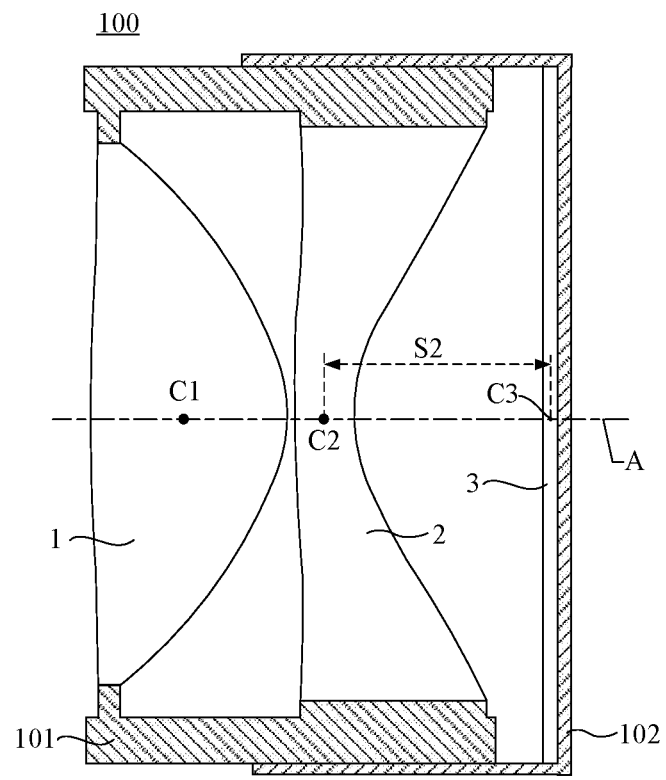
FIG. 12 is a structural diagram of yet another optical system, in accordance with some embodiments.

For example, as shown in FIG. 12, the movable component 102 drives the display 3 to move toward the negative focal power lens 2, and the distance S2 between the optical center C2 of the negative focal power lens 2 and the center C3 of the display 3 along the optical axis A is 13.6 mm. In this case, the diopter of the optical system 100 is −6 D.

Based on the above design, since the movable component 102 drives the display 3 to move along the optical axis A, it is possible to adjust the diopter of the optical system 100. For example, the diopter of the optical system 100 may be continuously adjusted from −1 D to −6 D.

Figure 13:
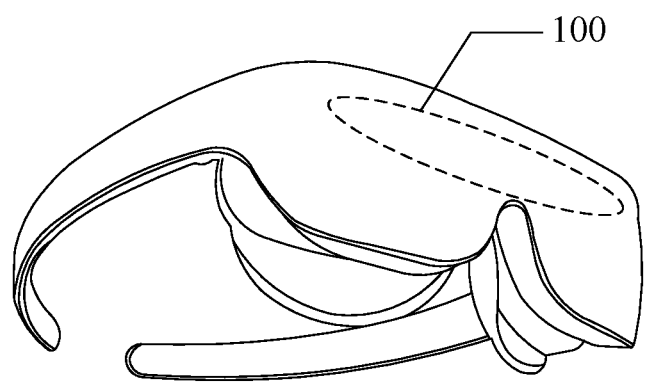
FIG. 13 is a structural diagram of a VR display device, in accordance with some embodiments.

As shown in FIG. 13, some embodiments of the present disclosure further provide a VR display device 200. The VR display device 200 may include the optical system 100 as described in the above embodiments.

The VR display device 200 in the embodiments of the present disclosure has a small aberration of viewing images, a small amount of distortion and a high image quality, which may bring the viewer a stronger sense of immersion. In addition, the VR display device 200 has a high light-emitting efficiency and a large field angle, and the device is thin and light and is comfortable to wear.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An optical system, having an optical axis, the optical system comprising a positive focal power lens, a negative focal power lens and a display that are sequentially arranged along the optical axis, wherein
the positive focal power lens includes a first convex surface that is away from the display and a second convex surface that is proximate to the display, and the first convex surface and the second convex surface are both outwardly convex with respect to an optical center of the positive focal power lens; the negative focal power lens includes a third convex surface that is away from the display and a fourth concave surface that is proximate to the display, the third convex surface is outwardly convex with respect to an optical center of the negative focal power lens, and the fourth concave surface is inwardly concave with respect to the optical center of the negative focal power lens;
for a refractive index of the positive focal power lens and a refractive index of the negative focal power lens, one refractive index is greater than another refractive index, a greater refractive index is a first refractive index, a smaller refractive index is a second refractive index, the first refractive index is greater than 1.7, the second refractive index is greater than 1.5, and a ratio of the first refractive index to the second refractive index is less than or equal to 2;

wherein a focal power of the positive focal power lens is in a range from 0.05 mm$^{-1}$ to 0.15 mm$^{-1}$, inclusive;

the refractive index of the positive focal power lens is greater than the refractive index of the negative focal power lens.

2. The optical system according to claim 1, wherein a radius of curvature of the fourth concave surface of the negative focal power lens is less than a radius of curvature of the third convex surface.

3. The optical system according to claim 1, wherein a radius of curvature of the fourth concave surface is greater than 0 mm, and less than or equal to 50 mm; a radius of curvature of the third convex surface is greater than 0 mm, and less than or equal to 100 mm.

4. The optical system according to claim 1, wherein the negative focal power lens includes a middle portion that is proximate to the optical axis and an edge portion that surrounds the middle portion;

a thickness of the middle portion along the optical axis is less than a thickness of the edge portion along the optical axis.

5. The optical system according to claim 1, wherein the ratio of the first refractive index to the second refractive index is less than or equal to 1.1.

6. The optical system according to claim 1, wherein a focal power of the negative focal power lens is in a range from −0.1 mm$^{-1}$ to −0.02 mm$^{-1}$, inclusive.

7. The optical system according to claim 1, wherein the first refractive index is $N_1$, and the second refractive index is $N_2$;

a distance between the second convex surface of the positive focal power lens and the third convex surface of the negative focal power lens along the optical axis is D;

wherein 0.53 mm<$N_1/N_2$ D<0.55 mm.

8. The optical system according to claim 7, wherein the distance between the second convex surface of the positive focal power lens and the third convex surface of the negative focal power lens along the optical axis is in a range from 0.5 mm to 0.55 mm, inclusive.

9. The optical system according to claim 7, wherein a distance, along the optical axis, between a vertex of the first convex surface of the positive focal power lens and a surface of the display away from the negative focal power lens is less than or equal to 35 mm.

10. The optical system according to claim 1, wherein the refractive index of the positive focal power lens is $N_a$, and a dispersion coefficient of the positive focal power lens is $V_a$;

the refractive index of the negative focal power lens is $N_b$, and a dispersion coefficient of the negative focal power lens is $V_b$;

wherein for $V_a/N_a$ and $V_b/N_b$, one is greater than another, and a ratio of a greater one to a smaller one is less than or equal to 2.5.

11. The optical system according to claim 1, wherein the first convex surface, the second convex surface, the third convex surface and the fourth concave surface are all aspherical surfaces.

12. The optical system according to claim 11, wherein the first convex surface, the second convex surface, the third convex surface and the fourth concave surface are all even-order aspheric surfaces;

a surface equation of each surface of the first convex surface, the second convex surface, the third convex surface and the fourth concave surface is $$Z = \frac{cr^2}{1+\sqrt{1-(k+1)c^2r^2}} + \sum_i A_{2i}r^{2i};$$

wherein Z is a vertical distance between a point on the surface and a first reference surface, and the first reference surface is tangent to a vertex of the surface; c is a curvature at the vertex of the surface; k is a quadric coefficient of the surface; r is a vertical distance between the point on the surface and the optical axis; $A_{2i}$ is a coefficient of a multiple order term; i is greater than or equal to 1 (i≥1), and i is an integer.

13. The optical system according to claim 1, wherein a material of the positive focal power lens includes glass, and a material of the negative focal power lens includes plastic.

14. The optical system according to claim 1, wherein a mass of the positive focal power lens is greater than a mass of the negative focal power lens.

15. The optical system according to claim 1, further comprising:

a fixed component, wherein the positive focal power lens and the negative focal power lens are disposed on the fixed component; and a movable component slidably connected to the fixed component, wherein the display is disposed on the movable component, and the movable component is configured to drive the display to move along the optical axis.

16. A VR display device, comprising the optical system according to claim 1.

17. The optical system according to claim 2, wherein the radius of curvature of the fourth concave surface is greater than 0 mm, and less than or equal to 50 mm; the radius of curvature of the third convex surface is greater than 0 mm, and less than or equal to 100 mm.

18. The optical system according to claim 8, wherein a distance, along the optical axis, between a vertex of the first convex surface of the positive focal power lens and a surface of the display away from the negative focal power lens is less than or equal to 35 mm.

19. An optical system, having an optical axis, the optical system comprising a positive focal power lens, a negative focal power lens and a display that are sequentially arranged along the optical axis, wherein the positive focal power lens includes a first convex surface that is away from the display and a second convex surface that is proximate to the display, and the first convex surface and the second convex surface are both outwardly convex with respect to an optical center of the positive focal power lens; the negative focal power lens includes a third convex surface that is away from the display and a fourth concave surface that is proximate to the display, the third convex surface is outwardly convex with respect to an optical center of the negative focal power lens, and the fourth concave surface is inwardly concave with respect to the optical center of the negative focal power lens;

for a refractive index of the positive focal power lens and a refractive index of the negative focal power lens, one refractive index is greater than another refractive index, a greater refractive index is a first refractive index, a smaller refractive index is a second refractive index, the first refractive index is greater than 1.7, the second refractive index is greater than 1.5, and a ratio of the first refractive index to the second refractive index is less than or equal to 2; and the refractive index of the positive focal power lens is $N_a$, and a dispersion coefficient of the positive focal power lens is $V_a$; the refractive index of the negative focal power lens is $N_b$, and a dispersion coefficient of the negative focal power lens is $V_b$;

wherein for $V_a/N_a$ and $V_b/N_b$, one is greater than another, and a ratio of a greater one to a wherein for N smaller one is less than or equal to 2.5.

* * * * *